US012802852B2

(12) United States Patent
Kiba

(10) Patent No.: US 12,802,852 B2
(45) Date of Patent: Nov. 17, 2026

(54) METHOD FOR MANUFACTURING MAGNET UNIT AND MAGNET UNIT

(71) Applicant: Nichia Corporation, Anan (JP)

(72) Inventor: Daizo Kiba, Itano-gun (JP)

(73) Assignee: Nichia Corporation, Anan (JP)

( * ) Notice: Subject to any disclaimer, the term of this patent is extended or adjusted under 35 U.S.C. 154(b) by 196 days.

(21) Appl. No.: 18/924,476

(22) Filed: Oct. 23, 2024

(65) Prior Publication Data

US 2025/0210238 A1 Jun. 26, 2025

(30) Foreign Application Priority Data

Dec. 20, 2023 (JP) ................................ 2023-215204
Aug. 5, 2024 (JP) ................................ 2024-129054

(51) Int. Cl.
*H01F 7/02* (2006.01)
*H01F 41/02* (2006.01)
*H02K 1/27* (2022.01)

(52) U.S. Cl.
CPC ......... *H01F 7/021* (2013.01); *H01F 41/0266* (2013.01); *H02K 1/27* (2013.01)

(58) Field of Classification Search
CPC .... H01F 7/021; H01F 41/0266; H01F 7/0231; H01F 2003/103; H02K 1/27; H02K 1/276; H02K 15/035; H02K 15/03; H02K 1/02; H02K 1/06; H02K 2213/03; B29C 45/0001; B29C 45/14065; B29C 45/14778;

(Continued)

(56) References Cited

U.S. PATENT DOCUMENTS

2002/0047409 A1 4/2002 Hiroyuki et al.
2013/0168899 A1 7/2013 Teysseyre et al.
(Continued)

FOREIGN PATENT DOCUMENTS

CN 104981967 A * 10/2015 ........... H02K 1/2773
CN 215151409 U 12/2021
JP H09-314614 A 12/1997
(Continued)

OTHER PUBLICATIONS

Lee, K.S. et al., "Design of the runner and gating system parameters for a multi-cavity injection mould using FEM and neural network," The International Journal of Advanced Manufacturing Technology (2006), vol. 27, No. 11-12, Mar. 2, 2005, pp. 1089-1096.

*Primary Examiner* — Mohamad A Musleh
(74) *Attorney, Agent, or Firm* — Kim & Stewart LLP

(57) ABSTRACT

A method for manufacturing a magnet unit is provided. The magnet unit includes a holding member having multiple slots and bonded magnets inside the slots, respectively. The manufacturing method includes a process of injecting a magnet material into the slots from a first end of the holding member via multiple gates, respectively, and a process of cutting the magnet material at the gates. The gates have different outlet areas. In the process of injecting, a flow of the magnet material flowing into the plurality of slots is regulated with the plurality of gates having the different outlet areas. Further, in the process of injecting, an internal pressure of the magnet material inside each of the plurality of slots does not exceed a threshold at which the holding member plastically deforms.

20 Claims, 8 Drawing Sheets

(58) Field of Classification Search
CPC ...... B29C 2045/0086; B29K 2105/203; B29K 2995/0008
See application file for complete search history.

(56) References Cited

U.S. PATENT DOCUMENTS

| | | | |
|---|---|---|---|
| 2018/0212497 | A1 | 7/2018 | Okuyama et al. |
| 2019/0238033 | A1 | 8/2019 | Okuyama et al. |

FOREIGN PATENT DOCUMENTS

| | | | |
|---|---|---|---|
| JP | 2003-023313 | A | 1/2003 |
| JP | 2003-117974 | A | 4/2003 |
| JP | 2008-302634 | A | 12/2008 |
| JP | 2009-132004 | A | 6/2009 |
| JP | 2015-061430 | A | 3/2015 |
| JP | 2015-093462 | A | 5/2015 |
| JP | 2016-123227 | A | 7/2016 |
| JP | 2017-028941 | A | 2/2017 |
| JP | 2017-169294 | A | 9/2017 |
| JP | 2018-019465 | A | 2/2018 |
| JP | 2018068059 | A | 4/2018 |
| JP | 2021-123081 | A | 8/2021 |

* cited by examiner

METHOD FOR MANUFACTURING MAGNET UNIT AND MAGNET UNIT

CROSS-REFERENCE TO RELATED APPLICATIONS

This application is based upon and claims the benefit of priority from Japanese Patent Application No. 2023-215204, filed on Dec. 20, 2023, and Japanese Patent Application No. 2024-129054, filed on Aug. 5, 2024; the entire contents of which are incorporated herein by reference.

FIELD

Embodiments described herein relate generally to a magnet unit and a method for manufacturing a magnet unit.

BACKGROUND

An interior permanent magnet motor includes a magnet embedded in a hole of a rotor core. A bonded magnet is formed in the hole of the rotor core by injection molding.

When injection-molding the material of the bonded magnet into the hole of a magnet unit such as a rotor core or the like, the holding member of the magnet unit may deform due to internal pressure generated inside the hole.

DETAILED DESCRIPTION

Figure 1:
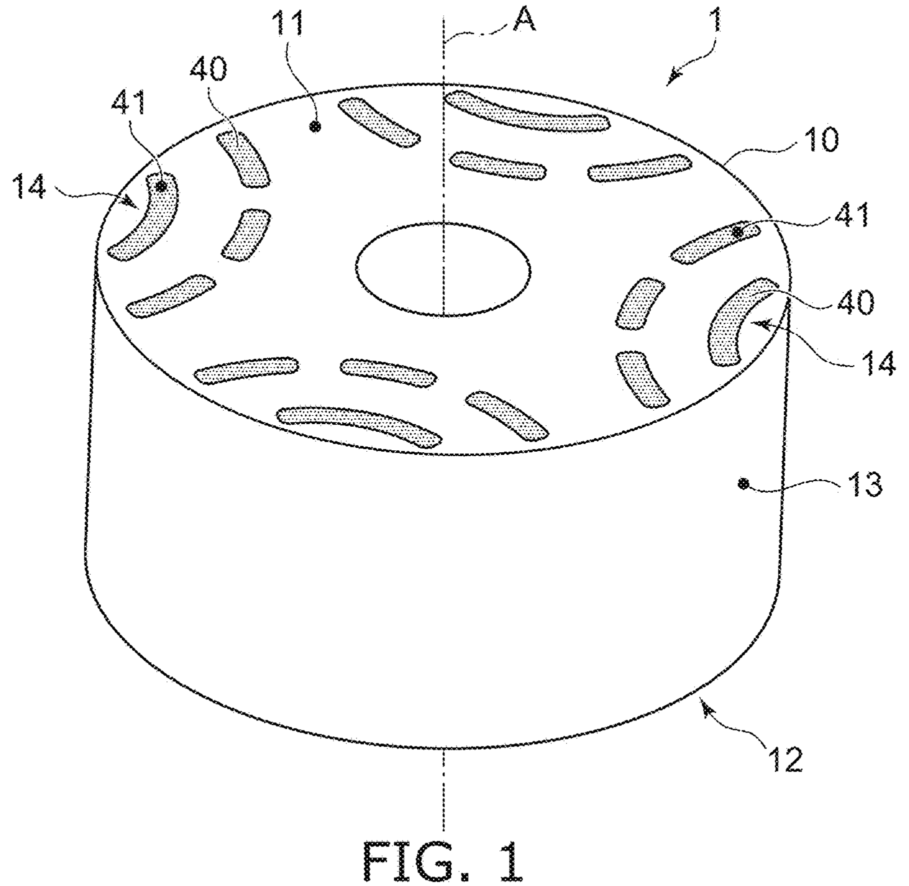
FIG. 1 illustrates a perspective view of a magnet unit according to an embodiment.

According to an aspect of the disclosure, a method for manufacturing a magnet unit is provided. The magnet unit includes a holding member having a plurality of slots therein, and a plurality of bonded magnets provided inside the plurality of slots, respectively. The manufacturing method includes a process of injecting a magnet material into the plurality of slots from a first end of the holding member via a plurality of gates, respectively. The plurality of gates is provided in a mold in which the holding member is placed and has different outlet areas. The manufacturing method further includes a process of cutting the magnet material at the plurality of gates. During the process of injecting the magnet material, a flow of the magnet material flowing into the plurality of slots is regulated with the plurality of gates having the different outlet areas. Also, during the process of injecting the magnet material, an internal pressure of the magnet material inside each of the plurality of slots does not exceed a threshold at which the holding member plastically deforms.

A magnet unit according to an aspect of the disclosure includes a holding member including a plurality of slots therein, and a plurality of bonded magnets inside the plurality of slots, respectively. The plurality of bonded magnets includes a plurality of gate marks at one end surface side thereof. The plurality of gate marks includes a first gate mark having a first area and located at a first distance from a central axis of the holding member and a second gate mark having a second area and located at a second distance from the central axis. The second area is different from the first area and the second distance is different from the first distance.

A magnet unit and a method for manufacturing a magnet unit according to embodiments of the disclosure will now be described with reference to the drawings. The following embodiments illustrate a magnet unit and a method for manufacturing a magnet unit that embody technical concepts of the embodiments, and are not limited to the following. Unless specifically stated, the dimensions, material properties, shapes, relative arrangements, and the like of the components according to the embodiments are not intended to limit the scope of the disclosure to those only, and are merely illustrative examples. The sizes, positional relationships, and the like of the members shown in the drawings may be exaggerated for clarity of description. In the following description, the same names and reference numerals refer to the same or similar members; and a detailed description is omitted as appropriate. In the following description, "area" means the "area" when viewed in plan unless otherwise noted. "Shape" is used as a concept that includes size. For example, when two shapes are similar to each other but have different sizes, the two shapes are considered to be different.

1. First Embodiment

1.1 Magnet Unit 1

Figure 2:
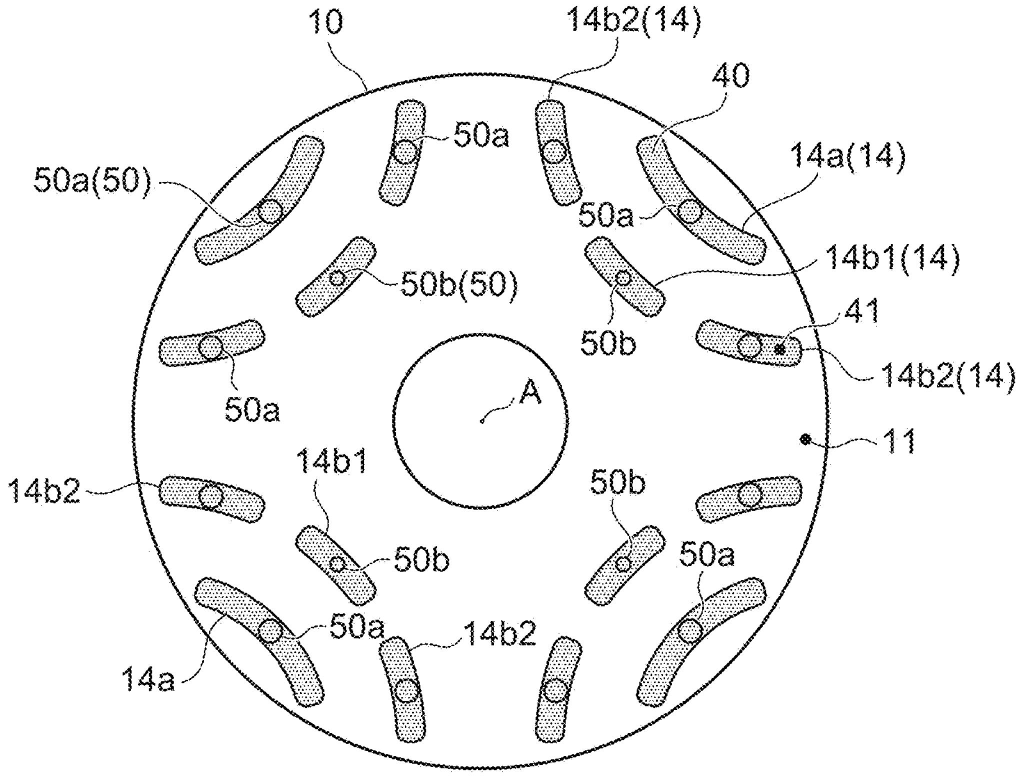
FIG. 2 illustrates a plan view of the magnet unit.

A magnet unit 1 according to a first embodiment will now be described using FIGS. 1 and 2. As an example, the magnet unit 1 is a rotor core and includes a holding member 10 and multiple bonded magnets 40. As an example as shown in FIG. 1, the holding member 10 is formed in a cylindrical shape and includes an outer side surface 13 along a central axis A of the holding member 10, and a first end surface 11 and a second end surface 12, which are one pair of end surfaces orthogonal to the central axis A. Multiple slots 14 are provided in the holding member 10 as holes extending from the first end surface 11 to the second end surface 12 along the central axis A. The multiple bonded magnets 40 are located respectively inside the multiple slots 14. Gate marks 50 are formed at exposed surfaces 41 of the bonded magnets 40 that are exposed at the first end surface 11 side (and may not be formed at exposed surfaces of the bonded magnets 40 at the second end surface 12 side).

The holding member 10 may be a magnetic body; as an example, the holding member 10 may be laminated steel sheets including multiple steel sheets stacked in the direction from the second end surface 12 toward the first end surface 11. The laminated steel sheets may be, for example, electrical steel sheets.

The bonded magnet 40 includes a resin and a magnetic powder. The resin can include the materials described below. The magnetic powder can include the materials described below. As an example, the bonded magnet 40 can include a resin and a SmFeN-based magnetic powder. It is favorable for the magnetic powder content ratio in the bonded magnet 40 to be not less than 50 volume %, and more favorably not less than 60 volume %. As a result, the residual magnetic flux density of the bonded magnet 40 can be increased. The volume percentage of the fill factor of the magnetic powder in the bonded magnet 40 may be calculated from a cross section of a portion of the bonded magnet 40. For example, a scanning electron microscope (SEM) image of the cross section of a portion of the bonded magnet 40 is imaged, and the ratio of the area of the magnetic powder to the area of the bonded magnet 40 in the SEM image may be considered to be the volume percentage of the fill factor of the magnetic powder in the bonded magnet 40.

The shapes, sizes, number, etc., of the multiple slots 14 provided in the holding member 10 are set according to target values of magnetic properties of the magnet unit 1. As an example, the number of the multiple slots 14 is not less than 2, and may be not less than 8, or not less than 30.

Favorably, the magnet unit 1 is rotationally symmetric around the central axis A. As an example according to the embodiment, the slots 14 are provided in the holding member 10 to have 4-fold rotational symmetry around the central axis A. In other words, as shown in FIG. 2, the slots 14 are formed to be rotationally symmetric every 90° around the central axis A when viewed in plan. When viewed in plan, the slots 14 include an outer slot 14*a* curved in an arc-like shape in the direction away from the outer side surface 13 of the holding member 10, and an inner slot 14*b* that is located further toward the central axis A than the outer slot 14*a* and is curved in an arc-like shape in the same direction as the outer slot 14*a*. In other words, the outer slot 14*a* is aligned on a first arc line (not shown) that is convex toward the central axis A. The inner slot 14*b* is subdivided into multiple sections, e.g., three, and includes one central part 14*b*1 and two end parts 14*b*2. Each of the subdivided sections may be referred to as a slot. As shown in FIG. 2, the central part 14*b*1 and the end parts 14*b*2 are aligned on a second arc line (not shown) that is convex toward the central axis A. In a specific implementation, the first and second arc lines are coaxially arranged, and the second arc line is closer to the central axis A than the first arc line. Further, in a specific implementation, as shown in FIG. 2, the outer slot 14*a* has a larger capacity than the central part 14*b*1 of the inner slot 14*b*, and thus the bonded magnet 40 in the outer slot 14*a* has a larger volume than the bonded magnet 40 in the central part 14*b*1 of the inner slot 14*b*.

The shapes of the multiple slots 14 when viewed in plan may be mutually similar shapes (i.e., when one shape can be enlarged or reduced to substantially match another shape); or, some shapes may be mutually similar shapes, while other shapes may be different from each other. In such a case, an aspect may be used in which multiple slots 14 having similar shapes and one or multiple slots 14 having different shapes are present in a region that is rotationally symmetric around the central axis A.

It is favorable for the ratio of a width W to a depth H of each of the multiple slots 14 to satisfy the relationship $1/10 \leq W/H \leq 1/50$, and more favorably the relationship $1/20 \leq W/H \leq 1/50$. Thus, as the depth H increases relative to the width W, the effects of the technical ideas of the disclosure are easily obtained because it becomes difficult to simultaneously fill the multiple slots 14. Also, it is favorable for the relationship $1/1 \leq Smin/Smax \leq 1/10$ to be satisfied, wherein Smax is the area of the largest slot 14 when viewed in plan, and Smin is the area of the smallest slot 14 when viewed in plan. Thus, as the difference between the areas of the multiple slots 14 when viewed in plan increases, the effects of the technical ideas of the disclosure are easily obtained because it becomes difficult to simultaneously fill the multiple slots 14.

The gate mark 50 that is formed at the exposed surface 41 of the bonded magnet 40 is formed when the magnet material 30 that is injected into the slot 14 from the first end surface 11 side is cut off. As an example, the gate mark 50 has, for example, a convex shape at the exposed surface 41. The shape of the gate mark 50 when viewed in plan is, for example, circular, elliptical, or oval. One or more gate marks 50 are provided for one bonded magnet 40.

The gate marks 50 include a first gate mark 50*a* and a second gate mark 50*b*. The areas of the gate marks 50 are different according to the distances from the central axis A. The distance when viewed in plan from the central axis A (hereinbelow, also called simply the distance) of the first gate mark 50*a* is greater than the distance of the second gate mark 50*b*; and the area of the first gate mark 50*a* is greater than the area of the second gate mark 50*b*. As shown in FIG. 2, the central part 14*b*1 of the inner slot 14*b* includes the second gate mark 50*b*; and the outer slot 14*a* and the end part 14*b*2 of the inner slot 14*b* include the first gate marks 50*a*.

1.2 Method for Manufacturing Magnet Unit 1

A method for manufacturing the magnet unit 1 according to the disclosure will now be described using FIGS. 3 to 9. In the specification, the term "process" includes not only an independent process, but also a process that cannot be clearly discriminated from other processes, as long as the expected purpose of the process is achieved.

Figure 3:
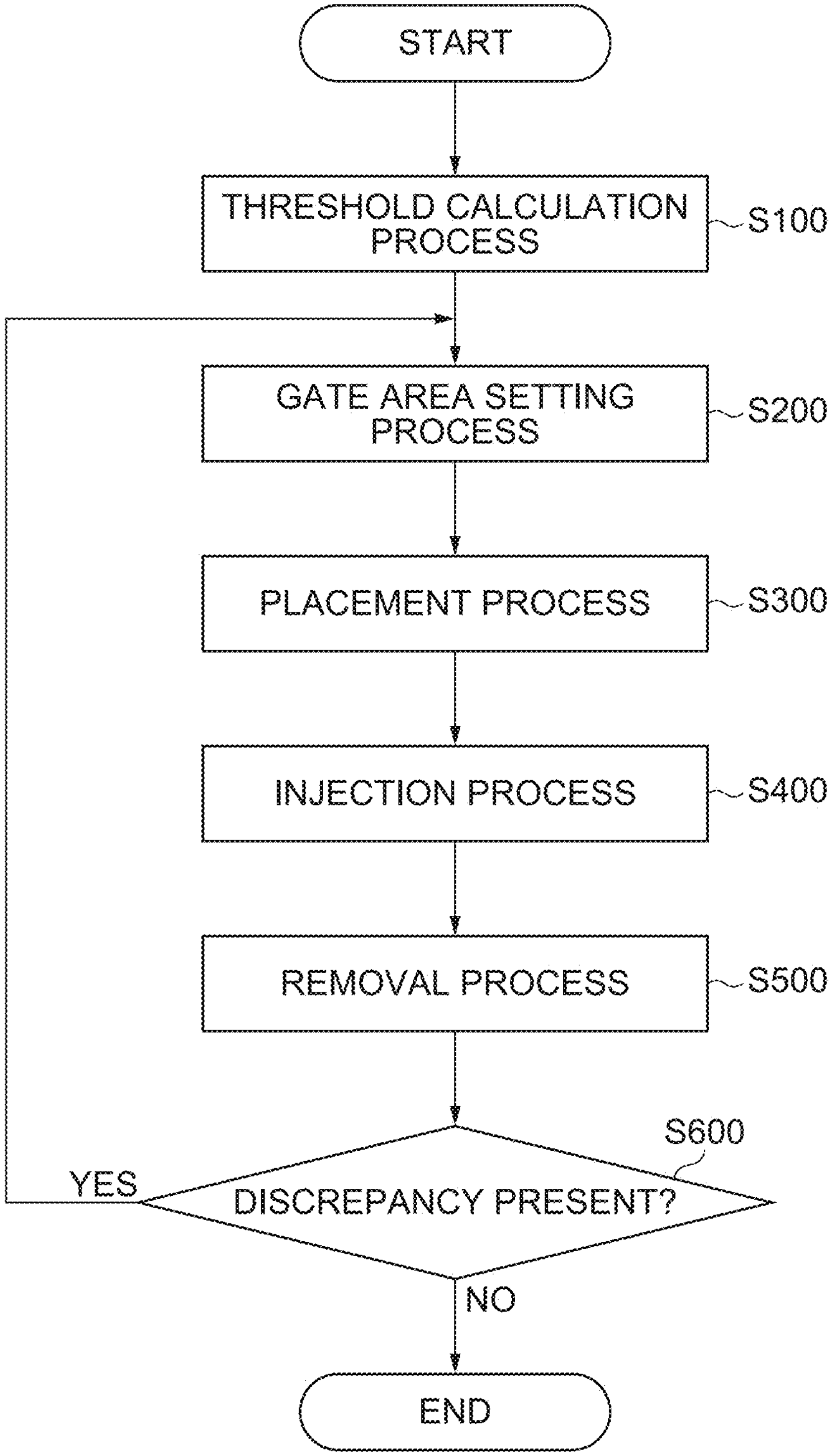
FIG. 3 is a flowchart for manufacturing processes of the magnet unit.

As shown in FIG. 3, manufacturing processes of the magnet unit 1 according to the embodiment include a threshold calculation process S100, a gate area setting process S200, a placement process S300, an injection process S400, and a removal process S500. The processes will now be described in detail.

1.2.1 Threshold Calculation Process

In the threshold calculation process (S100), a threshold of the internal pressure generated when injecting the magnet material 30 into the slots 14 in the subsequent injection process (S400) is calculated. As an example, the threshold can be determined as a pressure at which the holding member 10 plastically deforms by performing a strength analysis simulation based on the shape of the holding member 10.

Specifically, for example, the strength analysis simulation is performed using well-known finite element analysis software. The strength analysis simulation is performed by using, as input parameters, three-dimensional model data representing the shape of the holding member 10 and information related to the materials of the holding member 10. Examples of the information related to each material of the holding member 10 can include the material, material properties (specification), manufacturer, Young's modulus, Poisson's ratio, yield stress (F1), tensile strength, linear expansion coefficient, etc.

Figure 4:
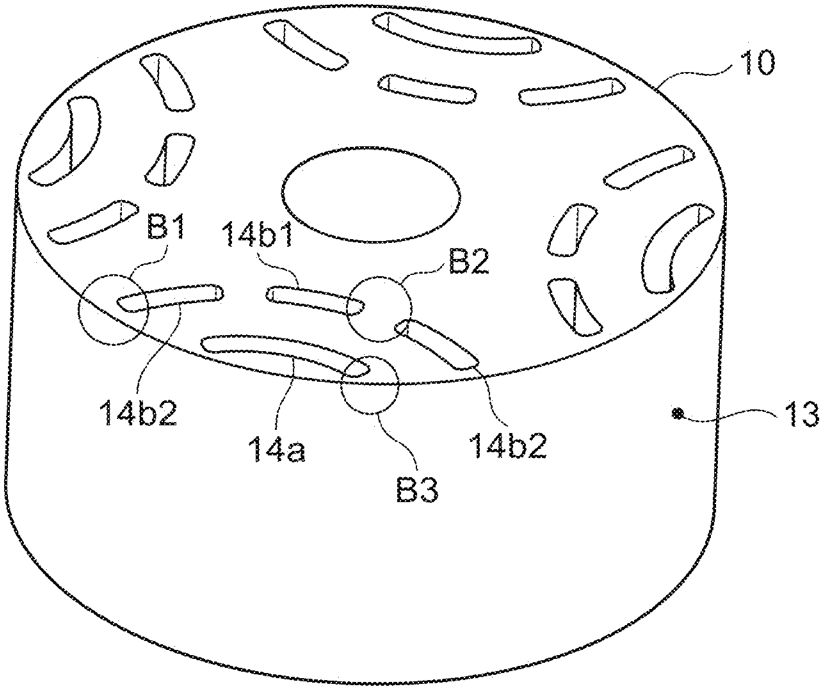
FIG. 4 illustrates a perspective view of the magnetic unit, describing sections that are likely to be deformed according to a strength simulation of a threshold calculation process.

As an example, when the strength analysis simulation of the holding member 10 having the shape shown in FIG. 4 is performed, examples of sections at which plastic deformation occurs due to internal pressure inside the slot 14 includes a section B1 between the outer side surface 13 and the end part 14*b*2 of the inner slot 14*b*, a section B2 between the central part 14*b*1 and the end part 14*b*2 of the inner slot 14*b*, a section B3 between the outer slot 14*a* and the outer side surface 13, etc. For example, the graph shown in FIG. 5 is obtained as the analysis result of the strength analysis simulation performed for these sections.

Figure 5:
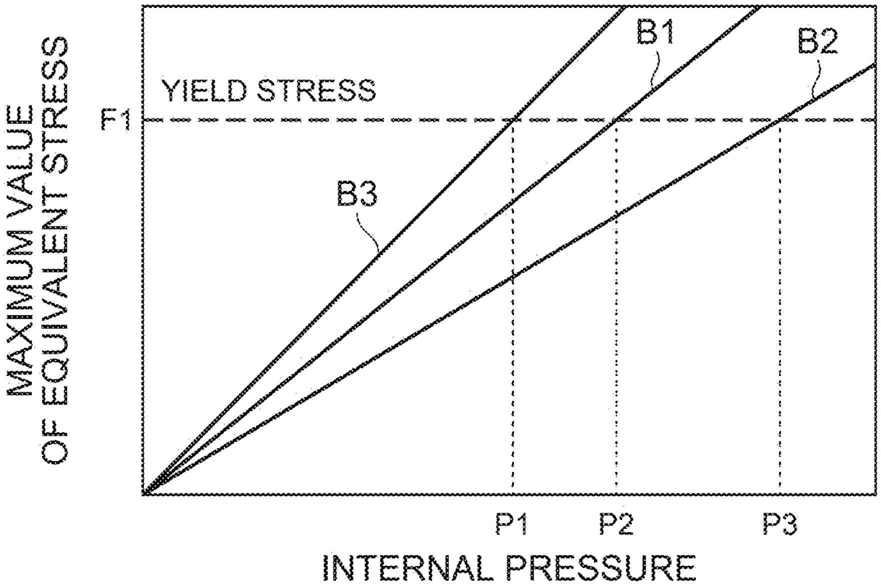
FIG. 5 is a graph describing a threshold of internal pressure of a magnetic material according to the threshold calculation process.

The graph shown in FIG. 5 shows the equivalent stress that may be generated at the sections B1 to B3 when the internal pressure is increased in the injection process. Plastic deformation occurs when the equivalent stress exceeds the yield stress F1 of the holding member 10. It can be seen from the analysis result shown in FIG. 5 that plastic deformation may occur at the section B3 when the internal pressure is P1. As a result, the threshold of the internal pressure when injecting the magnet material 30 into the slot 14 of the holding member 10 is calculated to be P1.

1.2.2 Gate Area Setting Process

In the gate area setting process (S200), the cross-sectional area of the gate 24 (see FIG. 6) when injecting the magnet material 30 into the slot 14 in the subsequent injection process (S400) is set. In the disclosure, the cross-sectional area of the gate 24 means the cross-sectional area of the opening (may be referred to as an outlet) of the gate 24, and therefore the cross-sectional area of the gate 24 may be referred to as an outlet area. The cross-sectional area is set by performing a flow analysis simulation.

Specifically, for example, well-known flow analysis software is used to perform the flow analysis simulation related to filling the magnet material 30 into the slots 14. In the simulation, the three-dimensional model data representing the shape of the holding member 10, the information related to the material of the magnet material 30 injected into the slots 14 in the injection process, information related to molding conditions when performing the injection process, and information related to the cross-sectional areas of the gates 24 are input to the flow analysis software as input parameters. Examples of the information related to the material of the magnet material 30 include the material name, the mixing ratio of the material, etc. Examples of the information related to the molding conditions include the resin temperature, the mold temperature, the injection speed (or the injection pressure), etc.

By performing the flow analysis simulation, it can be analyzed how the magnet material 30 will be filled into the slots 14 of the holding member 10 having the input shape. For example, the analysis result that is output shows that if the cross-sectional areas of the gates 24 injecting the magnet material 30 into the slots 14 of the holding member 10 are set to be constant, the slots 14 (i.e., the outer slot 14*a* and the end part 14*b*2 of the inner slot 14*b*) other than the central part 14*b*1 are not completely filled at the timing at which the filling of the central part 14*b*1 of the inner slot 14*b* is completed. Thus, when the filling timing is different between the slots 14, the internal pressure inside the slots 14 that undesirably fill quickly increases abruptly, which may cause plastic deformation of the holding member 10. To address such an issue, according to the embodiment, the cross-sectional areas of the multiple gates 24 are set so that the multiple slots 14 are filled at substantially the same timing. In other words, a flow of the magnet material 30 flowing into the plurality of slots 14 is regulated with the plurality of gates 24 having the set cross-sectional areas. In the disclosure, "filled at substantially the same timing" means that the multiple slots 14 reach a fill factor of 90% to 100% at the same timing, and more favorably means that the multiple slots 14 reach a fill factor of 95% to 100% at the same timing.

Specifically, for example, the cross-sectional areas of the multiple gates 24 are set to increase as the distances when viewed in plan of the gates 24 from the sprue 22, from which the magnet material 30 flows (see FIGS. 7 and 8), increase. In other words, by reducing the cross-sectional area of the gate 24 facing the central part 14*b*1, filling of the magnet material 30 can be adjusted so that the magnet material 30 is filled at the same timing as the other slots 14 (the outer slot 14*a* and the end part 14*b*2 of the inner slot 14*b*). When the cross-sectional shape of the gate 24 is circular, the cross-sectional area of the gate 24 may be set by setting the diameter of the gate 24. The diameter of the gate 24 means the diameter of the opening of the gate 24.

The flow analysis simulation also analyzes the pressure generated inside the slots 14 in addition to the timing of the filling of the slots 14. Thus, the cross-sectional areas of the multiple gates 24 are set so that the internal pressure generated by the material for the bonded magnet inside the multiple slots 14 does not exceed the threshold at which the holding member 10 plastically deforms, which is calculated in the threshold calculation process (S100).

1.2.3 Placement Process

Figure 6:
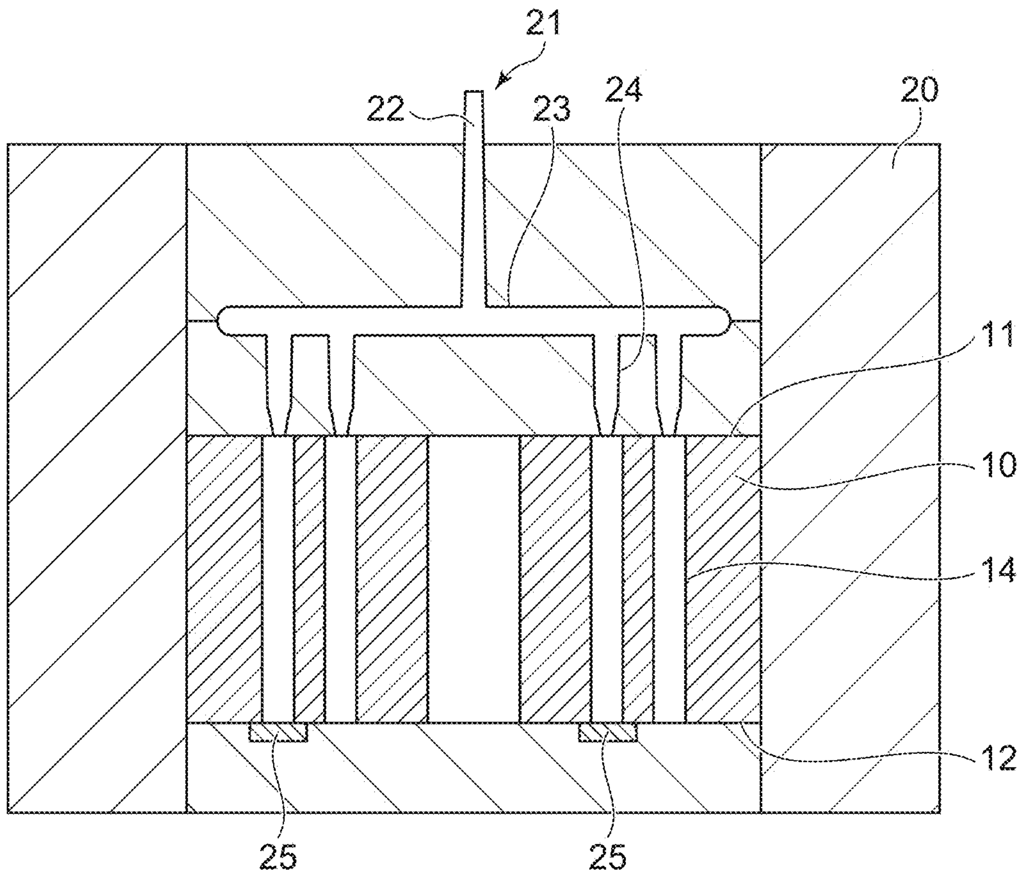
FIG. 6 illustrates a cross-sectional view of components to manufacture the magnetic unit for describing placement of a holding member in a mold in a placement process.

In the placement process (S300), the holding member 10 is placed in the mold 20. As shown in FIG. 6, the mold 20 includes multiple parts. Because the mold 20 includes multiple parts, the holding member 10 can be easily fixed by the mold 20; and the holding member 10 can be easily removed from the mold 20. The multiple distribution paths 21 through which the magnet material 30 flows are provided inside the mold 20.

Figure 7:
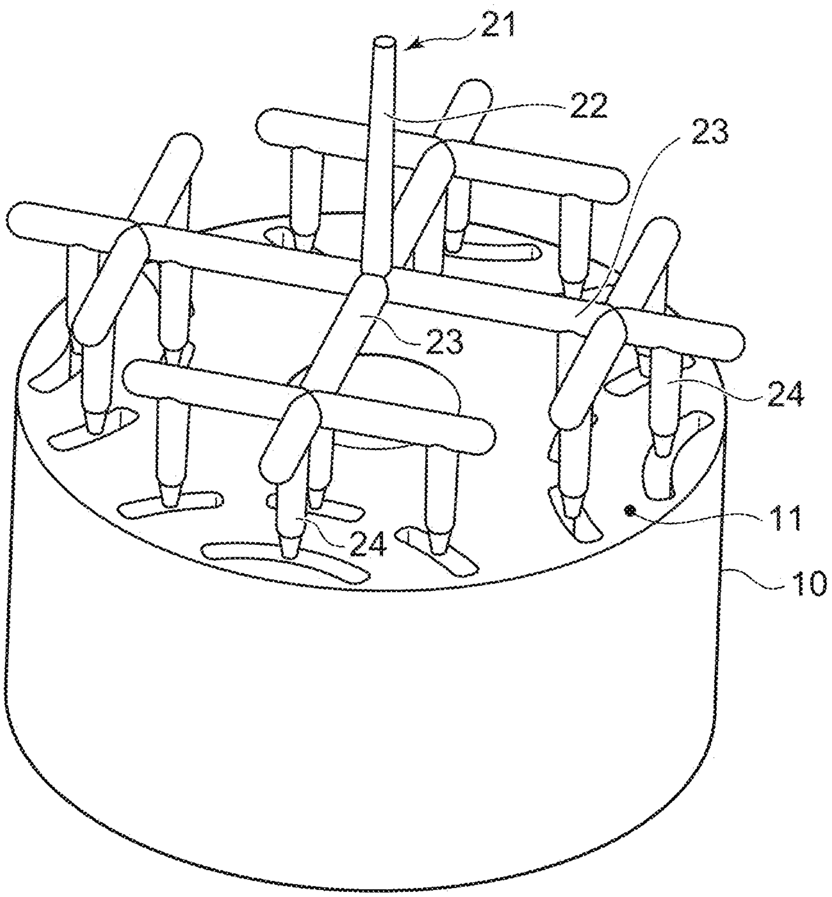
FIG. 7 illustrates a perspective view of the components, in particular, multiple distribution paths located inside a mold.
Figure 8:
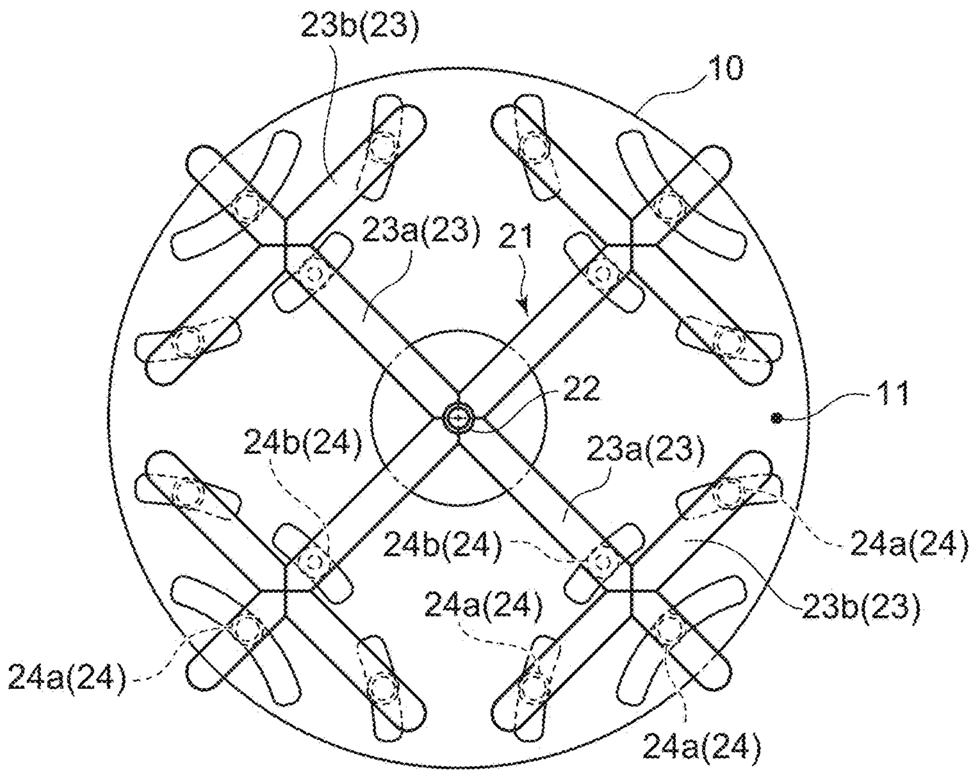
FIG. 8 illustrates a plan view of the components, in particular, the multiple distribution paths located inside the mold.

FIGS. 7 and 8 schematically show the multiple distribution paths 21 provided inside the mold 20. As shown in FIGS. 7 and 8, each of the multiple distribution paths 21 includes a sprue 22 extending in the vertical direction, a runner 23 extending in the horizontal direction from the sprue 22, and a gate 24 extending from the runner 23 toward the holding member 10 side. As an example, the sprue 22 is located on an extension line of the central axis A of the holding member 10. The gates 24 are branching off of the runners 23, and coupled to the slots 14, more specifically, arranged to face the openings of the slots 14 at the first end surface 11.

At least one pressure sensor 25 also may be included inside the mold 20. As an example as shown in FIG. 6, the pressure sensors 25 are arranged to face the openings of the slots 14 at the second end surface 12 side. In a specific implementation, one pressure sensor 25 is provided to face the opening of the outer slot 14*a* and another pressure sensor 25 is provided to face the opening of the central part 14*b*1 of the inner slot 14*b* (see also FIG. 2). As a result, the internal pressure of the magnet material 30 filled into the slot 14 can be accurately measured with the pressure sensor(s) 25.

As shown in FIG. 8, the distribution paths 21 are rotationally symmetric every 90° around the central axis A of the holding member 10 when viewed in plan. The runners 23 include extension parts 23*a* extending in radial directions from the sprue 22, and branch parts 23*b* branching from the extension parts 23*a*. Thus, by locating the sprue 22 on the extension line of the central axis A of the holding member 10 and by making the multiple runners 23 extending from the sprue 22 in the horizontal direction and the multiple gates 24 extending from the multiple runners 23 rotationally symmetric around the central axis A, the magnet material 30 is easily filled uniformly into the slots 14.

As described above, the cross-sectional areas of the multiple gates 24 are set to increase as the distances from the sprue 22 from which the magnet material 30 flows increases. As shown in FIG. 8, the gates 24 include a first gate 24*a* and a second gate 24*b*. The distance from the sprue 22 to the first gate 24*a* is greater than the distance from the sprue 22 to the second gate 24*b*; and the cross-sectional area of the first gate 24*a* is greater than the cross-sectional area of the second gate 24*b*.

1.2.4 Injection Process

Figure 9:
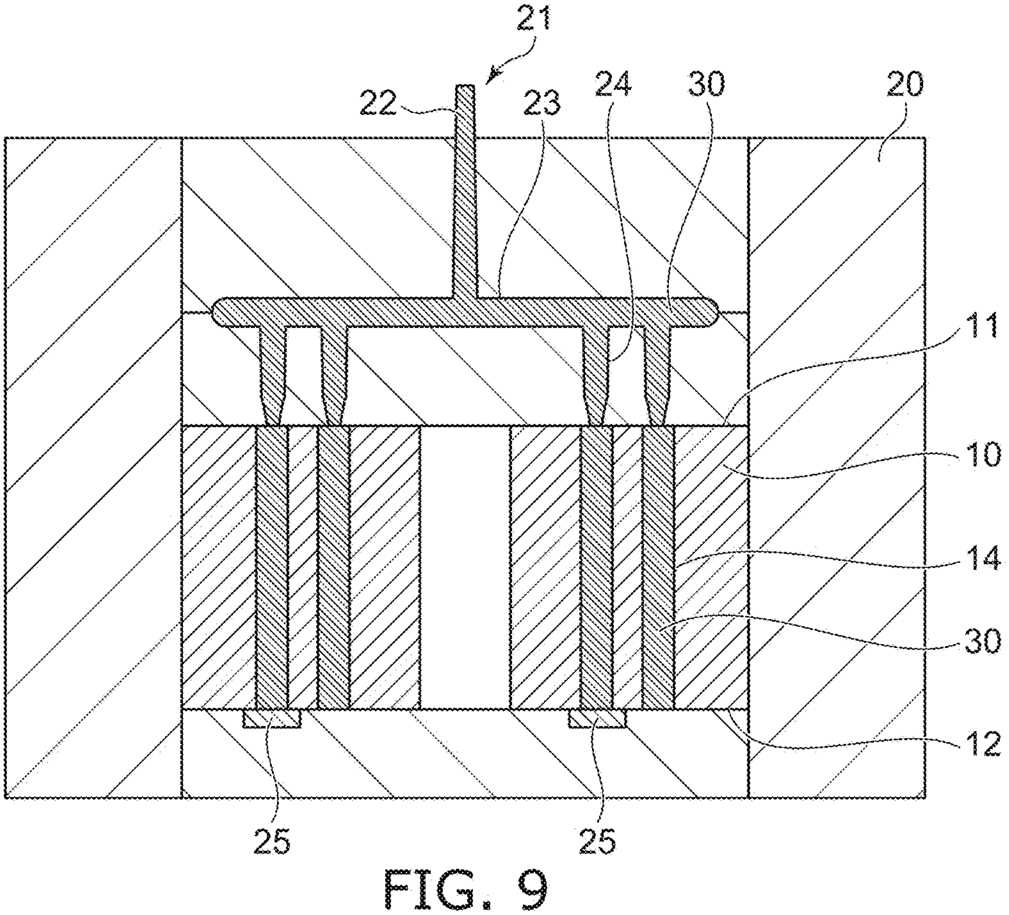
FIG. 9 illustrates a cross-sectional view of the components for describing an injection process.

In the injection process (S400), the magnet material 30 is filled into the slots 14 by injecting the magnet material 30 into the multiple slots 14 by injection molding. As shown in FIG. 9, the magnet material 30 is injected from the sprue 22 into the mold 20, passes through the runners 23 and the gates 24, and reaches the slots 14. For example, the injection process can be performed until the slots 14 are filled with the magnet material 30. The degree to which the slots 14 are filled when the injection molding ends may be appropriately set according to the target magnetic properties of the magnet unit 1.

The magnet material 30 includes a resin and a magnetic powder. The resin may be a thermoplastic resin or a thermosetting resin. The resin may include both a thermosetting resin and a thermoplastic resin. The resin is, for example, a thermoplastic resin; however, even when a thermosetting resin is used, the technical ideas of the disclosure can be favorably implemented.

Examples of the thermoplastic resin include a nylon resin (a polyamide resin); polyolefins such as polypropylene (PP) and polyethylene (PE); polyester; polycarbonate (PC); polyphenylene sulfide resin (PPS); polyetheretherketone (PEEK); polyacetal (POM); and a liquid crystal polymer (LCP). Examples of the nylon resin include polylactams such as nylon 6, nylon 11, and nylon 12; condensates of dicarboxylic acid and diamine such as nylon 6,6, nylon 6,10, and nylon 6,12; copolyamides such as nylon 6/6,6, nylon 6/6,10, nylon 6/12, nylon 6/6,12, nylon 6/6,10/6,10, nylon 6/6,6/6,12, and nylon 6/polyether; and nylon 6T, nylon 9T, nylon MXD6, aromatic nylon, and amorphous nylon. For example, nylon 12 can be used as the thermoplastic resin.

Examples of the magnetic powder include rare earth magnetic powders such as SmFeN, NdFeB, SmCo, etc. The magnetic powder may be a SmFeN-based magnetic powder. In such a case, the magnet material 30 includes a resin and a SmFeN-based magnetic powder. Examples of the SmFeN-based magnetic powder include nitrides made of the rare-earth metal of Sm, iron (Fe), and nitrogen (N) of the general formula $Sm_xFe_{100-x-y}N_y$. It is favorable for x to be not less than 8.1 atomic % and not more than 10 atomic %, y to be not less than 13.5 atomic % and not more than 13.9 atomic %, and the remainder to be mainly Fe. The magnetic powder may be a SmFeN-based magnetic powder having a $Th_2Zn_{17}$ crystal structure. The magnetic powder may be a SmFeN-based anisotropic magnetic powder. For example, the SmFeN-based magnetic powder can be manufactured by a method discussed in JP-A H11-189811 (Kokai). The magnetic powder may include a SmFeN-based core portion, and a covering portion including P and O. Surface treatment of the magnetic powder may be performed using a silane coupling agent, etc.

It is favorable for the average particle size of the magnetic powder to be not more than 10 μm. As a result, the crystal particle size can be reduced, and the coercivity of the magnetic powder can be increased. The fluidity of the magnet material 30 tends to decrease as the average particle size of the magnetic powder decreases. It is more favorable for the average particle size of the magnetic powder to be not more than 6 μm, and more favorably not more than 4 μm. The coercivity of the magnetic powder can be further increased thereby. It is favorable for the average particle size of the magnetic powder to be not less than 1 μm. The fill factor of the magnetic powder in the magnet material 30 can be increased thereby. It is more favorable for the average particle size of the magnetic powder to be not less than 2 μm, and more favorably not less than 2.5 μm. It is favorable for the average particle size of the magnetic powder to be not less than 1 μm and not more than 10 μm, more favorably not less than 2 μm and not more than 10 μm, and more favorably not less than 2 μm and not more than 4 μm. The average particle size is measured as the particle size corresponding to 50% of the cumulative volume of the particle size distribution from the small particle size side, and can be measured by, for example, a laser diffraction particle size analyzer (HELOS & RODOS of Japan Laser Corp.).

The span of the magnetic powder, as defined by span=(D90−D10)/D50, can be not more than 2, and favorably not more than 1.5, wherein the particle sizes D90, D10, and D50 are the particle sizes corresponding to cumulative sums of the particle size distribution of 90%, 10%, and 50%. When greater than 2, the coercivity tends to decrease due to the increase of the ratio of micro magnetic powders with small coercivities.

It is favorable for the fill factor of the magnetic powder in the magnet material 30 to be not less than 50 volume %, and more favorably not less than 60 volume %. The residual magnetic flux density of the bonded magnet 40 obtained can be increased thereby.

To obtain the bonded magnet 40 with oriented magnetic powder, a process of magnetizing the magnet material 30 may be performed by applying a magnetic field for orientation to the magnet material 30 in the injection process (S400). The application of the magnetic field for orientation is started at least before the resin completely hardens. The easy magnetization axes of the magnetic powder included in the magnet material 30 can be aligned by applying the magnetic field to the magnet material 30. The mold 20 may include an orientation magnet to apply the magnetic field to the magnet material 30. An electromagnet or a permanent magnet can be used as the orientation magnet. When a permanent magnet is used as the orientation magnet, the application of the magnetic field and the injection molding are simultaneously performed. The magnitude of the orientation field can be, for example, not less than 637 kA/m (8 kOe) and not more than 1,511 kA/m (19 kOe).

1.2.5 Removal Process

In the removal process (S500), the holding member 10 is removed from the mold 20. The magnet unit 1 is obtained thereby. When the process of magnetizing is performed during the injection process (S400), the magnet material 30 that is injected into the slot 14 becomes the bonded magnet 40 in the magnet unit 1 that is removed. The magnet material 30 that remains in the gate 24 is cut at the opening of the gate 24 to be separated from the bonded magnet 40 inside the slot 14. As a result, the gate mark 50 is formed at the exposed surface 41 of the bonded magnet 40; and the area of the gate mark 50 is substantially equal to the cross-sectional area of the gate diameter.

A process of performing secondary magnetization of the magnet material 30 may be performed after the removal process (S500). In such a case, a magnetic field for secondary magnetization is applied to the holding member 10 holding the magnet material 30 inside the slot 14. Examples of the magnetization method include pulsed magnetic field generation, static magnetic field generation, etc. The magnitude of the magnetic field for magnetization in the magnetizing process may be, for example, not less than 1,990 kA/m (25 kOe) and not more than 4,777 kA/m (60 kOe). The magnetic field for magnetization in the process of performing secondary magnetization can be greater than the magnetic field for orientation in the injection process (S400). The magnet unit 1 in which the magnetic force of the bonded magnet 40 inside the slot 14 is maximized is obtained thereby.

After the removal process (S500), it is determined in process S600 whether or not there is a discrepancy in the magnet unit 1. Examples of the discrepancy include the occurrence of plastic deformation in the magnet unit 1, the measured value of the pressure sensor 25 mounted inside the mold 20 exceeding a predetermined threshold, etc.

When there is a discrepancy in the magnet unit 1 (Yes in S600), the injection molding is newly performed with modified molding conditions. For example, when the injection speed into the mold 20 is slow, the injection is performed more preferentially for the slots 14 proximate to the sprue 22. Also, when the resin temperature is high, the fluidity of the magnet material 30 becomes high, and so the injection is performed more easily for the slots 14 distant to the center, even at a low injection pressure. Thus, when discrepancies are not resolved even when the molding conditions are modified, the gate area setting process (S200) is re-performed. On the other hand, when there is no discrepancy in the magnet unit 1 or when the discrepancies are resolved (No in S600), the manufacturing processes end.

1.3 Summary

As described above, the magnet unit 1 according to the embodiment of the disclosure includes the holding member 10 in which the multiple slots 14 are provided, and the bonded magnets 40 located respectively inside the multiple slots 14. The method for manufacturing the magnet unit 1 includes a process of injecting the magnet material 30 through openings of the multiple slots 14 at one end respectively via the multiple gates 24, and a process of cutting the magnet material 30 at the multiple gates. The cross-sectional areas of the multiple gates 24 are set so that the internal pressures of the magnet material 30 inside the multiple slots 14 each are not more than a threshold at which the holding member 10 plastically deforms; and the threshold is calculated based on a shape of the holding member 10.

By using such a configuration, the internal pressure generated inside the slot 14 can be suppressed, and deformation of the holding member 10 can be prevented.

The cross-sectional areas of the multiple gates 24 may be set so that the multiple slots 14 are filled at the same timing. By using such a configuration, the internal pressure inside the slot 14 can be prevented from abruptly increasing when the magnet material 30 is quickly filled into some of the multiple slots 14.

In the process of injecting the magnet material 30, the magnet material 30 may be injected into the slots 14 by passing through the sprue 22 located on the extension line of the central axis of the holding member 10, the multiple runners 23 arranged to be branched from the sprue 22 in radial directions of the magnet unit 1, and the multiple gates 24 which are ends of the multiple runners 23; and the cross-sectional areas of the multiple gates 24 may be set to increase as the distances from the sprue 22 increase. By using such a configuration, the flow rate can be increased for the magnet material 30 flowing in the gates 24 that are distant to the sprue 22 and are not easily filled; and the multiple gates 24 are easily filled at substantially the same timing.

The cross-sectional area of the gate may be set by setting the cross-sectional shape of the gate to be circular and by setting the diameter of the gate. By setting such a configuration, the cross-sectional areas of the gates 24 located inside the mold 20 are easily set to optimal values.

1.4 Modification

A magnet unit 2 according to a modification of the embodiment will now be described with reference to FIGS. 10 to 12 with focus on differences with the embodiment above. Configurations similar to those of the embodiment above are marked with the same reference numerals; and the description is not repeated.

Figure 10:
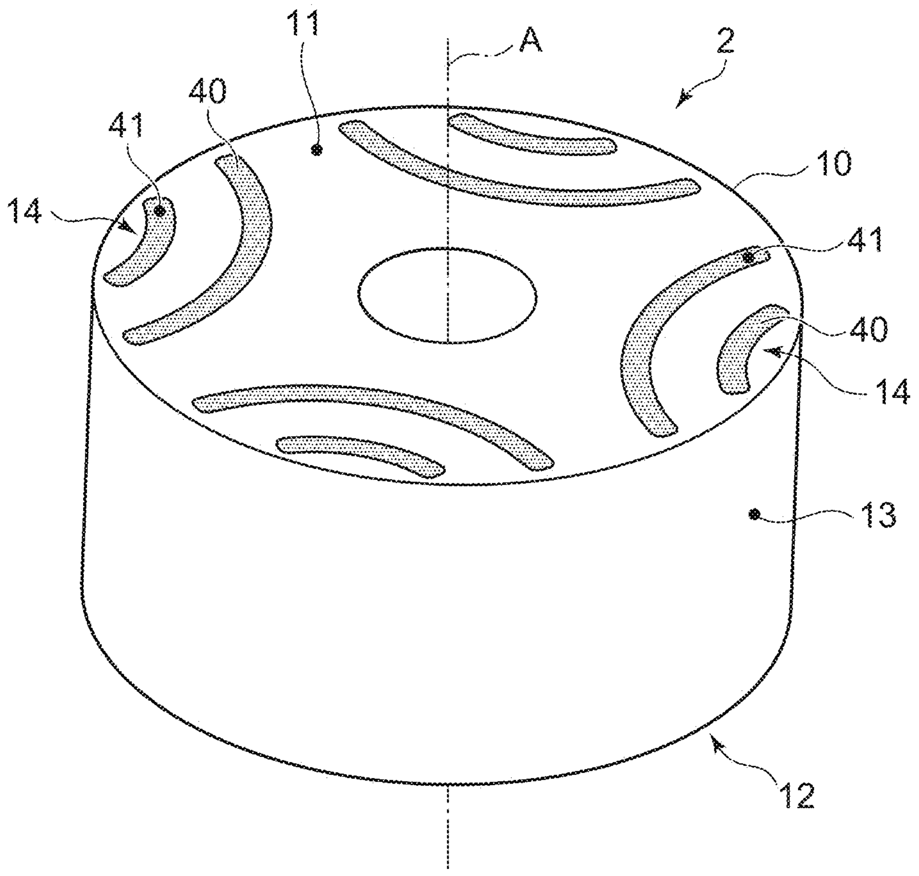
FIG. 10 illustrates a perspective view of a magnet unit according to a modification.
Figure 11:
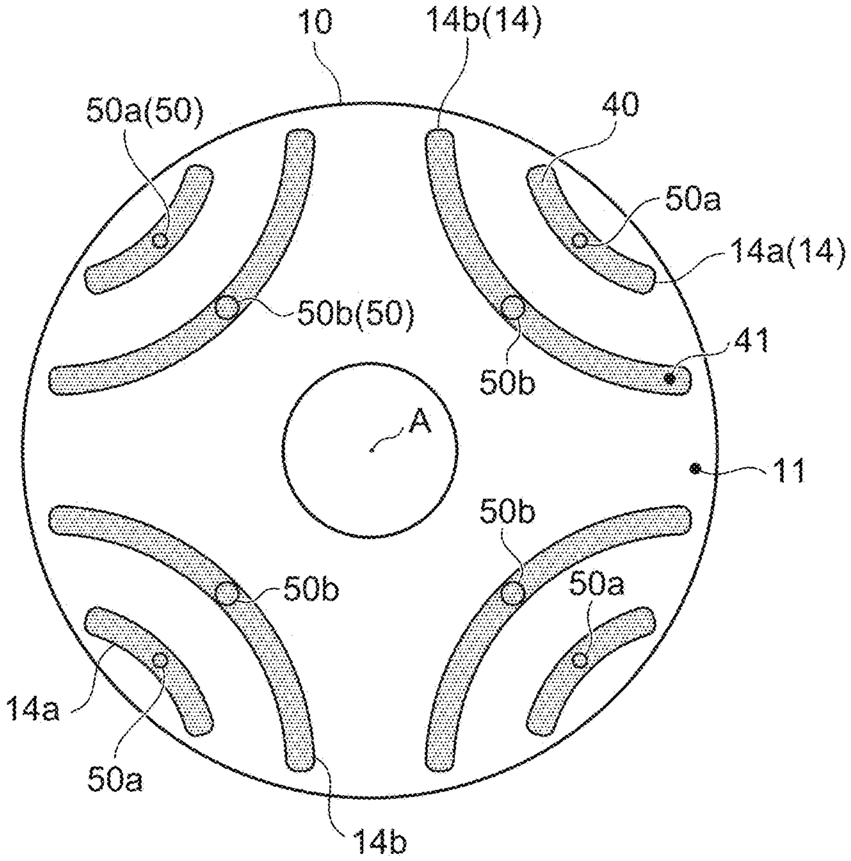
FIG. 11 illustrates a plan view of the magnet unit according to the modification.

In the magnet unit 2 according to the modification as shown in FIGS. 10 and 11, the shapes and number of the slots 14 are different from those of the magnet unit 1 described above. Specifically, the inner slot **14*b* of the magnet unit 2 is not subdivided into three, and is connected in an arc-like shape in the direction away from the outer side surface 13 of the holding member 10. The area of the first gate mark 50*a* included in the outer slot 14*a* is less than the area of the second gate mark 50*b* included in the inner slot 14*b***.

The size relationship between the cross-sectional area of the gate **24*a* facing the outer slot 14*a* and the cross-sectional area of the gate 24*b* facing the inner slot 14*b* may be modified as appropriate according to the volumes and/or molding conditions of the slots 14. As an example, it is favorable for $A \leq B$ when $C/D \leq 0.4$, and $B \leq A$ when $2.5 \leq C/D$, wherein B is the diameter of the gate 24*a*, D is the volume of the outer slot 14*a*, A is the diameter of the gate 24*b*, and C is the volume of the inner slot 14*b***.

Figure 12:
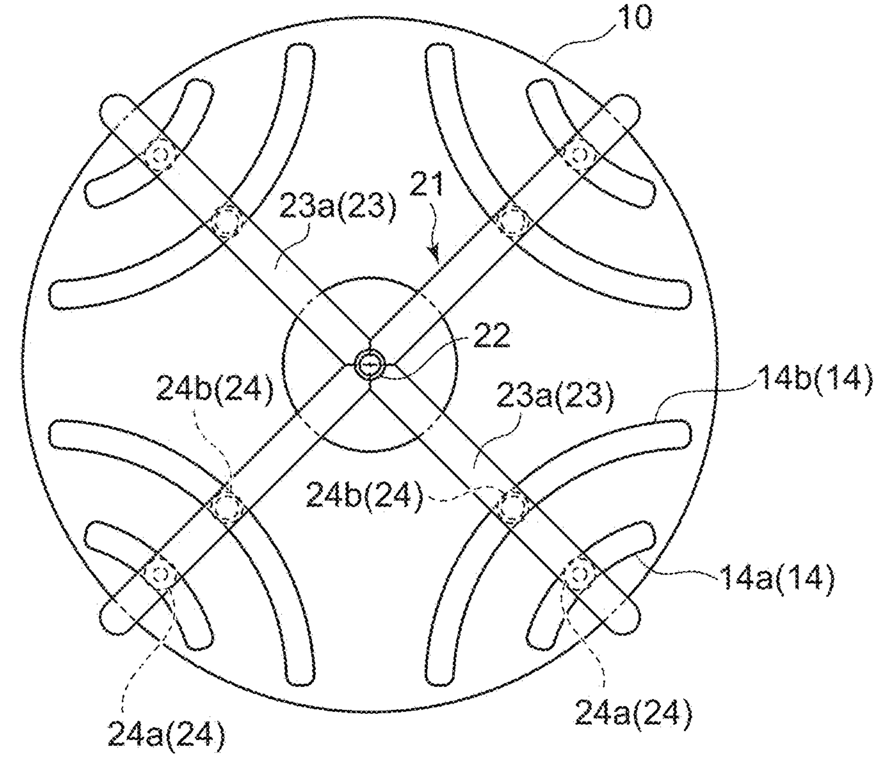
FIG. 12 illustrates a plan view of components to manufacture the magnetic unit according to the modification, in particular, the multiple distribution paths located inside the mold.

As shown in FIG. 12, in the distribution path 21 inside the mold 20 used when manufacturing the magnet unit 2, the runners 23 include only the extension parts **23*a* extending in radial directions from the sprue 22. The distance from the sprue 22 to the first gate 24*a* is greater than the distance from the sprue 22 to the second gate 24*b*; and the cross-sectional area of the first gate 24*a* is less than the cross-sectional area of the second gate 24*b*. Thus, according to the modification, the inner slot 14*b* is connected and has a larger volume, and so the cross-sectional area of the second gate 24*b* facing the inner slot 14*b* is set to be greater than the cross-sectional area of the first gate 24*a* facing the outer slot 14*a* so that more of the magnet material 30 flows. By such a magnet unit 2** as well, the technical ideas of the disclosure are applicable, and effects similar to those of the embodiment above can be obtained.

2. Other Embodiments

Although embodiments of the disclosure are described above, the embodiments are not limited thereto. For example, although the holding member 10 is formed in a cylindrical shape in the embodiments above, other shapes may be used. Although the slots 14 include the outer slot **14*a* and the inner slot 14*b* and have 4-fold rotational symmetry when viewed in plan according to the embodiments above, the slots 14 are not limited to the examples. In other words, the outer slot 14*a* and the inner slot 14*b*** may be connected, and may have n-fold rotational symmetry other than 4-fold rotational symmetry. Specifically, even rotational symmetry in which n=2, 6, 8, etc., may be used, or odd rotational symmetry in which n=3, 5, 7, etc., may be used. Or, there may not be rotational symmetry.

According to the embodiments above, the presence or absence of discrepancies is checked (S600) after the removal process (S500). Alternatively, once the appropriate cross-sectional area of the gate 24 and molding conditions have been determined, the magnet unit 1 may be manufactured by performing the threshold calculation process (S100) to the removal process (S500) without checking the presence or absence of discrepancies.

According to the embodiments above, a rotor core is discussed as an example of the magnet unit; however, the magnet unit is not limited thereto. In other words, the technical ideas of the disclosure are applicable to a magnet unit other than a rotor core including a holding member and a bonded magnet; and effects similar to those of the embodiments above can be obtained.

In the foregoing, certain embodiments of the present invention have been described with reference to specific examples. The present disclosure, however, is not limited to these specific examples. All forms implementable by a person skilled in the art by suitably making design changes based on any of the embodiments of the present invention described above also fall within the scope of the present invention so long as they encompass the subject matter of the present invention. Furthermore, various modifications and alterations within the spirit of the present invention that could have been made by a person skilled in the art also fall within the scope of the present disclosure.

What is claimed is:

1. A method for manufacturing a magnet unit, the magnet unit including a holding member having a plurality of slots therein and a plurality of bonded magnets provided inside the plurality of slots, respectively, the method comprising:
- injecting a magnet material into the plurality of slots from a first end of the holding member via a plurality of gates, respectively, the plurality of gates being provided in a mold in which the holding member is placed, and having different outlet areas; and
- cutting the magnet material at the plurality of gates,
- wherein during said injecting, a flow of the magnet material flowing into the plurality of slots is regulated with the plurality of gates having the different outlet areas, and an internal pressure of the magnet material inside each of the plurality of slots does not exceed a threshold at which the holding member plastically deforms.

2. The method according to claim 1, wherein during said injecting, the plurality of slots are filled with the magnet material at substantially a same timing.

3. The method according to claim 1, wherein
- said injecting includes injecting the magnet material into the plurality of slots through, in order:
  - a sprue provided in the mold and disposed in a direction along a central axis of the holding member;
  - a plurality of runners provided in the mold and branched in radial directions of the holding member from the sprue; and
  - the plurality of gates, and
- the outlet areas of the plurality of gates are larger as distances to the gates from the sprue increase.

4. The method according to claim 3, wherein during said injecting, the sprue is disposed on an extension line of the central axis.

5. The method according to claim 4, wherein each outlet of the gates has a circular shape.

6. The method according to claim 1, further comprising:
- mounting a pressure sensor to face an opening of at least one of the plurality of slots at a second end of the holding member opposite to the first end; and
- measuring the internal pressure of the magnet material that is being injected into the at least one of the plurality of slots with the pressure sensor.

7. The method according to claim 1, wherein
- the holding member has a cylindrical shape, and
- the plurality of gates includes a first gate at a first distance from a central axis of the holding member and a second gate at a second distance from the central axis of the holding member, the second distance being longer than the first distance, and
- an outlet area of the second gate is larger than an outlet area of the first gate.

8. The method according to claim 7, wherein the first gate is coupled to a first slot of the plurality of slots and a second gate is coupled to a second slot of the plurality of slots during said injecting, the second slot having a larger capacity than the first slot.

9. The method according to claim 8, further comprising:
- mounting a first pressure sensor to face an opening of the first slot at a second end of the holding member opposite to the first end and a second pressure sensor to face an opening of the second slot at the second end; and
- measuring the internal pressure of the magnet material that is being injected into the first slot with the first pressure sensor and the internal pressure of the magnet material that is being injected into the second slot with the second pressure sensor.

10. The method according to claim 7, wherein
- the first gate is coupled to a first slot of the plurality of slots and a second gate is coupled to a second slot of the plurality of slots during said injecting, and
- the first slot and the second slot are aligned on an arc line that is convex toward the central axis of the holding member.

11. The method according to claim 7, wherein
- the first gate is coupled to a first slot of the plurality of slots and a second gate is coupled to a second slot of the plurality of slots during said injecting, and
- the first slot is aligned on a first arc line that is convex toward the central axis of the holding member, and the second slot is aligned on a second arc line that is convex toward the central axis of the holding member, the first and second arc lines being coaxially arranged, the first arc line being closer to the central axis of the holding member than the second arc line.

12. The method according to claim 1, wherein
- the holding member has a cylindrical shape,
- the plurality of gates includes a first gate at a first distance from a central axis of the holding member and a second gate at a second distance from the central axis of the holding member, the second distance being longer than the first distance, and
- an outlet area of the second gate is smaller than an outlet area of the first gate.

13. The method according to claim 12, wherein the first gate is coupled to a first slot of the plurality of slots and a second gate is coupled to a second slot of the plurality of slots during said injecting, the second slot having a smaller capacity than the first slot.

14. The method according to claim 12, wherein
- the first gate is coupled to a first slot of the plurality of slots and a second gate is coupled to a second slot of the plurality of slots during said injecting, and the first slot is aligned on a first arc line that is convex toward the central axis of the holding member, and the second slot is aligned on a second arc line that is convex toward the central axis of the holding member, the first arc line being closer to the central axis of the holding member than the second arc line.

15. A magnet unit, comprising:

a holding member including a plurality of slots therein; and a plurality of bonded magnets located inside the plurality of slots, respectively, the plurality of bonded magnets including a plurality of gate marks at one end surface side thereof, the plurality of gate marks including a first gate mark having a first area and located at a first distance from a central axis of the holding member and a second gate mark having a second area and located at a second distance from the central axis, the second area being different from the first area and the second distance being different from the first distance.

16. The magnet unit according to claim 15, wherein the first area is less than the second area, and the first distance is less than the second distance.

17. The magnet unit according to claim 16, wherein the plurality of bonded magnets includes a first bonded magnet including the first gate mark and a second bonded magnet including the second gate mark.

18. The magnet unit according to claim 17, wherein the second bonded magnet has a larger volume than the first bonded magnet.

19. The magnet unit according to claim 17, wherein the first bonded magnet and the second bonded magnet are aligned on an arc line that is convex toward the central axis of the holding member.

20. The magnet unit according to claim 17, wherein the first bonded magnet is aligned on a first arc line that is convex toward the central axis of the holding member, and the second bonded magnet is aligned on a second arc line that is convex toward the central axis of the holding member, the first and second arc lines being coaxially arranged, the first arc line being closer to the central axis of the holding member than the second arc line.

* * * * *